March 3, 1931.  C. E. WILLIAMS  1,794,661
JACK FOR MOTOR VEHICLES
Filed Sept. 20, 1926    2 Sheets-Sheet 1
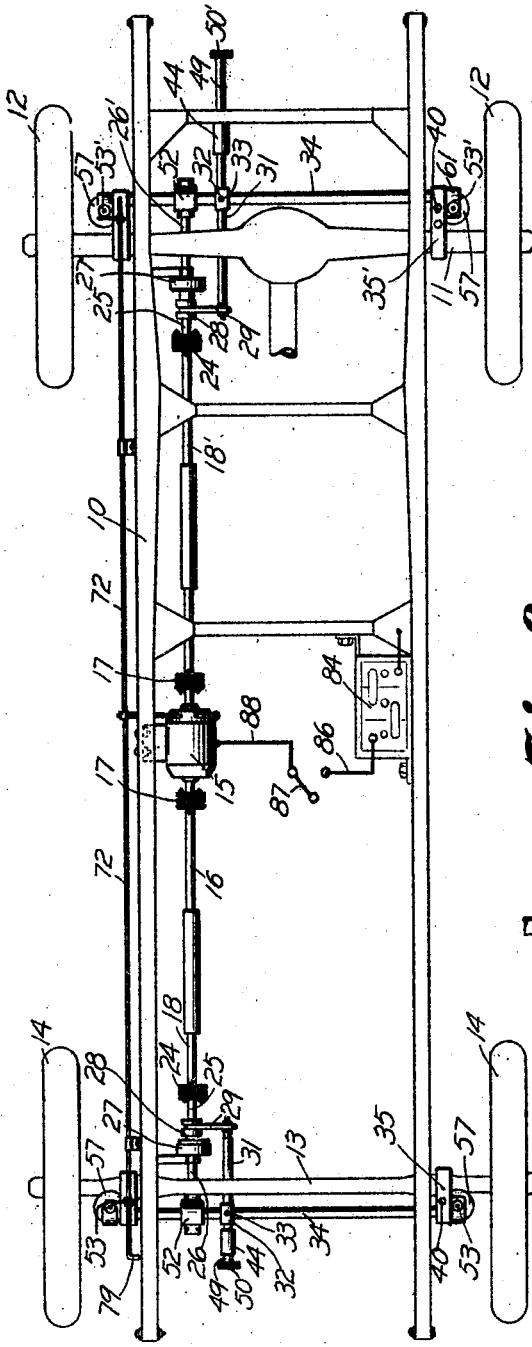
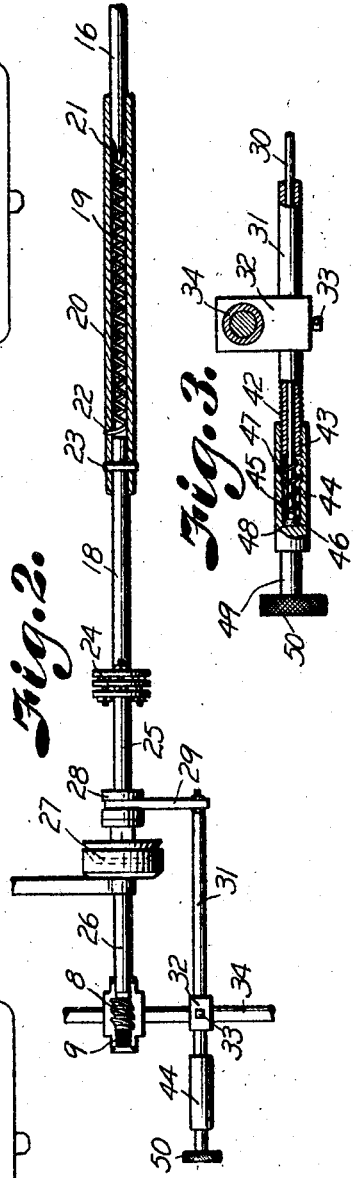
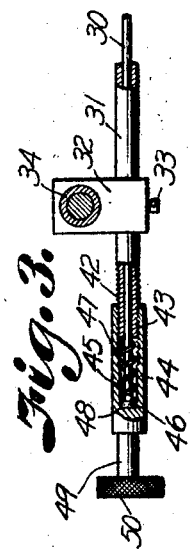
INVENTOR
Clarence E. Williams.
BY *Arthur C. Brown*
ATTORNEY March 3, 1931.  C. E. WILLIAMS  1,794,661
JACK FOR MOTOR VEHICLES
Filed Sept. 20, 1926   2 Sheets-Sheet 2
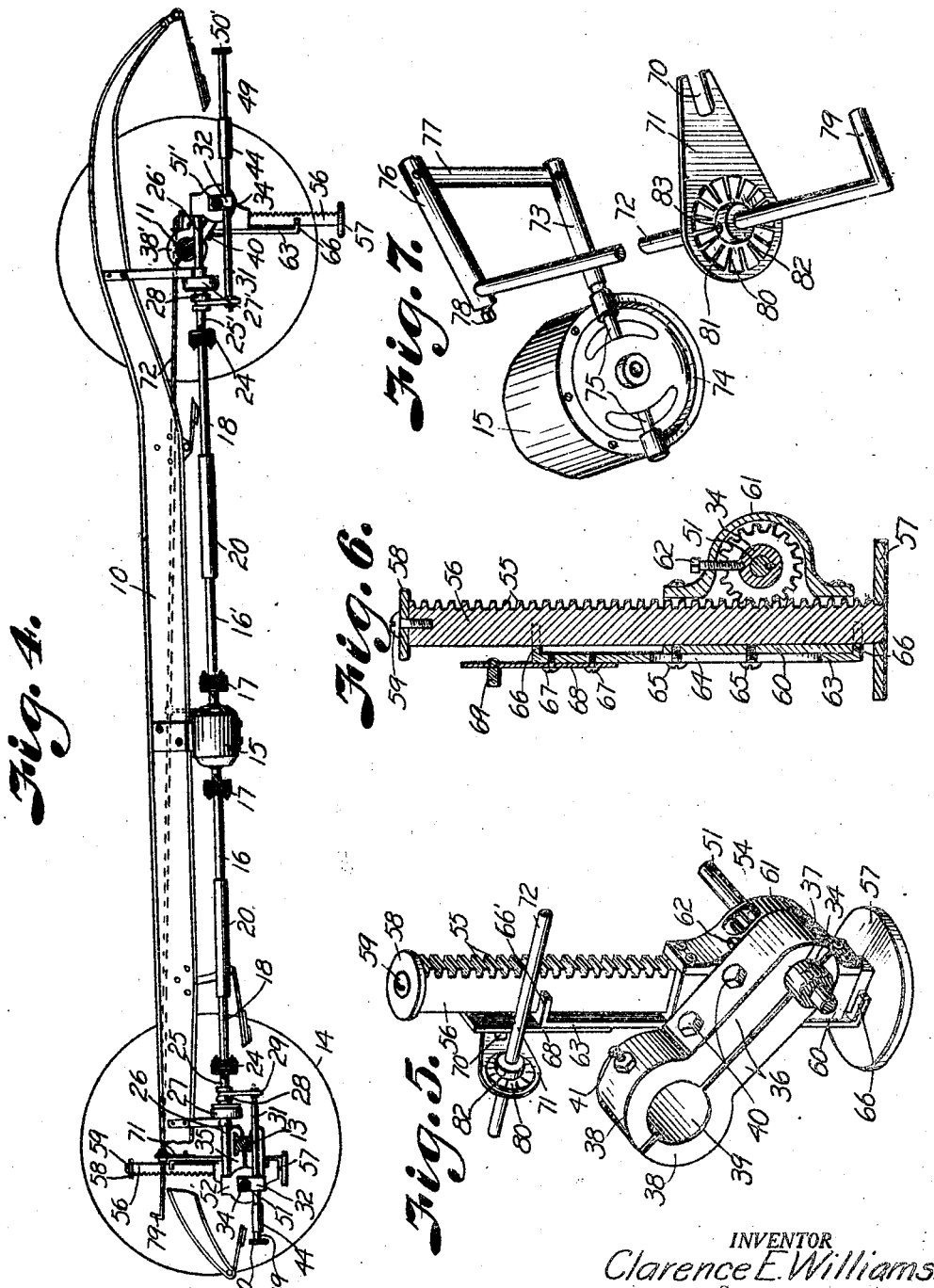
INVENTOR
Clarence E. Williams
BY
ATTORNEY Patented Mar. 3, 1931

1,794,661

UNITED STATES PATENT OFFICE

CLARENCE E. WILLIAMS, OF KANSAS CITY, KANSAS, ASSIGNOR OF ONE-HALF TO T. B. WATKINS, OF KANSAS CITY, MISSOURI

JACK FOR MOTOR VEHICLES

Application filed September 20, 1926. Serial No. 136,508.

My invention relates to a jack for motor vehicles and more particularly to a power operated jack.

It is a purpose of my invention to provide means for raising the wheels of a vehicle off the ground or other supporting surface, comprising jacks mounted on the front and rear axles thereof and means on the vehicle for operating the jacks together with means for connecting and disconnecting the operating means and the driving means for the jacks whereby either the jacks associated with the front or the rear axle or both of the same may be operated by the operating means to raise either the front or rear wheels off the supporting surface.

It is a further purpose of my invention to provide automatic means for limiting the movement of the jacks in opposite directions, said means automatically throwing the operating means out of operation. The jacks are preferably driven by means of a motor which is adapted to be driven in opposite directions by shifting the brushes thereof and the automatic limiting means is constructed so as to shift the brushes to a neutral position, thus stopping the motor when the desired limit of movement has been reached. Preferably the motor is connected with longitudinally extending shafts that have clutch mechanisms interposed therein and which drive transversely extending shafts that are geared to the movable members of the jacks. Thus by throwing in either or both of the clutches, either the jacks associated with the rear or the front wheels or both may be operated.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 1 is a plan view of the chassis of an automobile, showing my improved jack mechanism applied thereto.

Fig. 2 is a fragmentary view partly in section and partly in elevation of the driving means for one set of jacks.

Fig. 3 is a similar view of the clutch operating means associated therewith.

Fig. 4 is a side elevation, partly broken away, of a vehicle showing one set of wheels in raised position with the jacks in engagement with the supporting surface and the other set of wheels in engagement with the supporting surface and the jacks in retracted position.

Fig. 5 is a perspective view of one of the jacks associated with the rear axle.

Fig. 6 is a vertical sectional view thereof, and

Fig. 7 is a fragmentary perspective view of a portion of the automatic stop mechanism.

Referring in detail to the drawings:

In Fig. 1 is shown a vehicle having a framework 10, the rear axle 11 having the rear wheels 12 mounted thereon and the front axle 13 having the front wheels 14 mounted thereon in the usual manner. Mounted preferably on one of the longitudinally extending members of the framework is a motor 15 which is connected with the shaft portions 16 and 16' by means of the universal joints 17. Each of the shaft portions 16 and 16' are connected with the shaft portions 18 and 18' associated therewith by means of a spring driving connection comprising a coiled spring 19 mounted in an elongated tubular sleeve-like member 20, the spring 19 engaging in an eye 21 in the end of the shaft portion 16 or 16' as the case may be, and the other end thereof entering an opening 22 in the tubular member 19. The shaft portions 18 and 18' are connected with the tubular members 19 by means of the cross pins 23 or any other suitable means so that said tubular members 20 rotate with the shaft portions 18 or 18'. The shaft portions 18 and 18' are connected respectively by means of the universal joints 24 with the shaft portions 25 and 25' which are in turn connected with the shaft portions 26 and 26' by means of the clutch members 27 and 27′ respectively.

The clutch members 27 and 27′ are identical in construction except that the position thereof is reversed, and are each provided with suitable shifting members 28 by means of which the same are thrown into and out of operation. Said shifting members are operated by means of the usual yoke-like members 29 which are in turn operated by means of the rods 30. The rods 30 are slidably mounted in the sleeves 31 which are secured in fixed position on the brackets 32 by means of set screws 33, said brackets 32 being carried by the tubular members 34, which tubular members 34 are supported adjacent the front and rear axles 13 and 11 by means of the brackets 35 and 35′ respectively. The brackets 35 and 35′ are made in substantially the same manner except that the shape thereof where the same engage with the front and rear axles is different due to the difference in shape of the axles. Each of said brackets comprises the jaws 36 which are provided with transversely extending concave grooves 37 in which the tubular member 34 engages and each being furthermore provided with jaw portions 38 at the opposite ends thereof which are provided with transversely extending grooves 39 that correspond in shape to the axle upon which the same are mounted. Said members are secured in clamping engagement with the tubular members 34 and the axles 13 and 11 by means of the bolts 40 and in the case of the brackets 35′ associated with the rear axle, are provided with set screws 41 engaging with the axle to prevent rotation of the bracket thereon.

The tubular members 31 are externally threaded at one end thereof as indicated at 42 and engage screw-threadedly with the internal threads 43 on the operating member 44 which has the socket 45 in which the head 46 on the rod 30 is adapted to slide. Mounted between the head 46 and the end of the member 31 is a compression spring 47 which holds the head 46 against the end wall 48 of the socket 45. The member 44 is provided with a reduced extension 49 terminating in a knurled head or knob 50 by means of which the member 44 may be rotated. In order to more clearly explain the operation of the device, the knob associated with the clutch 27 is indicated by the numeral 50, while that associated with the clutch 27′ is indicated by the numeral 50′.

The shaft portions 26 and 26′ are operatively connected with the transversely extending shafts 51 and 51′ respectively by means of the worm gearings 52 each comprising worms 8 on the shafts 26 and 26′ and worm wheels 9 on the shafts 51 and 51′. The shaft 51 is provided for operating the jacks 53 associated with the front wheels and the shaft 51′ is provided for operating the jacks 53′ associated with the rear wheels of the vehicle. Each of the jacks 53 and 53′ are connected with and driven by the shafts 51 and 51′ in the same manner, and accordingly only one of said jacks and the devices associated therewith are described in detail. The shafts 51 and 51′ are each provided with the gears 54 which mesh with the racks 55 provided on the movable members 56 of said jacks. The members 56 are provided at the lower ends thereof with feet 57 that are adapted to engage with the ground or other supporting surface and have the disk-like members 58 mounted on the opposite ends thereof by means of the screws 59. Each of the jacks is provided with a housing 60 having an outwardly bowed portion 61 within which the gear 54 is mounted. The tubular member 34 extends into the housing 60 and is secured to the bowed out portion 61 thereof by means of the set screw 62 to thus hold the jack from rotation around the axis of the shaft 51 or 51′.

Mounted on the housing 60 is a stop member 63 which is provided with a slot 64 through which the screws 65 extend, said screws being screw-threadedly mounted in the member 60 so that the stop member 63 is guided for longitudinal sliding movement relative to the housing 60. The member 63 is provided at one end thereof with fingers 66 extending laterally therefrom so as to lie on opposite sides of the movable member 56 of the jack, and is provided with similar laterally extending fingers 66′ at the opposite end thereof. It will be seen that as the member 56 moves upwardly the foot 57 thereon will engage with the fingers 66 carrying the member 63 along therewith, and that when the member 56 moves downwardly the disk 58 will engage with the fingers 66′ to move the member 63 downwardly therewith. Secured to the member 63 by any suitable means such as the screws 67, is a plate 68 which carries the pivot pin 69. The pivot pin 69 operates in a slot 70 in the crank arm 71 which embraces the longitudinally extending shaft-like member 72 extending lengthwise of the frame 10, as will be clear from Fig. 1. The member 72 is connected with a brush actuating arm 73 carrying the yoke-like member 74 on the end thereof which is provided with the inwardly extending members 75 engaging with the brush holders of the motor 15 to shift the same. The connection between the shaft 72 and the arm 73 is made by means of the arm 76 and link 77 which are pivoted to each other, and the link 77 is pivoted to the arm 73 as will be clear from Fig. 7. The arm 76 is mounted to rotate with the shaft 72 by means of a set screw 78, the arrangement of arms and links being provided so that the longitudinally extending member of the frame adjacent the shaft 72 can be avoided. The shaft 72 is provided with a handle member 79 by means of which the brushes may be shifted by hand. The brushes are, however, also shifted to a neutral position which is substantially the position shown in Fig. 7, by means of the member 63 when it is engaged by either the member 58 or the member 57 to actuate the crank 71. A resilient clutch mechanism is provided between the shaft 72 and the crank 71 comprising the disk-like resilient member 80 which has the slots 81 therein to increase the resiliency of the same, said disk-like member frictionally engaging with the side face of the member 71 and being provided with a collar 82 mounted on the shaft 72 by means of the set screw 83, a similar collar being provided on the opposite side of the member 71, as will be obvious, to hold the member 71 in proper relationship to the member 80. The resilient member 80 is thus held in frictional engagement with the member 71 and will ordinarily operate the member 72 due to swinging of the crank 71 about the axis of the shaft 72, but will not interfere with the shifting of the brushes by means of the handle 79.

The motor is, of course, operated by means of a battery 84 shown diagrammatically in Fig. 1, which is grounded to the frame by means of the conductor 85 and which has the conductor 86 extending to the switch 87 from which the conductor 88 leads to the motor 15, one of the terminals of the motor being also grounded to the frame.

It will accordingly be seen that either the front wheels 14 can be raised off the ground or the rear wheels 12 raised off the ground by closing the switch 87 and throwing in either the clutch 27 or the clutch 27', or both the wheels 14 and 12 may be raised by throwing in both the clutches 27 and 27' by actuation of the members 50 and 50' respectively. When the movable members 56 of the jacks have moved either to their retracted position or to their supporting position, the automatic stop member 63 will be actuated to swing the crank member 71 around to such a position that the shaft 72 is rotated through an arc sufficient to move the brush shifting arm 73 to a neutral position, whereupon the motor 15 will stop and the jacks will be prevented from moving beyond a predetermined point in the desired direction of movement. After this has been done the switch 87 is opened so as to prevent the running down of the battery 84.

What I claim and desire to secure by Letters Patent is:—

1. In an automobile jack device including shaft operating means, a pair of jack housings, a rack member slidable in each housing, a sleeve having opposite ends fixed in the housings, a rotatable shaft extending through the housings and the sleeve and having gears in mesh with said rack members, and brackets fixed to the sleeve for supporting the housings from the automobile.

2. In apparatus of the character described, a pair of jack housings, a rack member slidable in each housing, a sleeve having opposite ends fixed in the housings to connect the same, a rotatable shaft in the sleeve, gears on said shaft in the housings in mesh with said rack members, means for rotating the shaft to move the rack members relative to the housings, and brackets including mating portions adapted to be clamped to the sleeve.

In testimony whereof I affix my signature.
CLARENCE E. WILLIAMS.